United States Patent [19]

Meisenheimer, Jr. et al.

[11] Patent Number: 4,907,622
[45] Date of Patent: Mar. 13, 1990

[54] FLUID RESERVOIR DEVICE

[75] Inventors: Daniel T. Meisenheimer, Jr., Orange; David T. Ho, West Haven, both of Conn.

[73] Assignee: Spectrum Associates, Inc., Milford, Conn.

[21] Appl. No.: 312,423

[22] Filed: Feb. 17, 1989

Related U.S. Application Data

[63] Continuation of Ser. No. 71,913, Jul. 10, 1987, abandoned.

[51] Int. Cl.⁴ ............................................. F16L 55/04
[52] U.S. Cl. ...................................... 138/31; 138/26; 137/492.5
[58] Field of Search ................ 135/26, 30, 31, DIG. 6; 220/85 B; 137/492.5, 494

[56] References Cited

U.S. PATENT DOCUMENTS

| | | | |
|---|---|---|---|
| 1,434,952 | 11/1922 | Johnson | 138/DIG. 6 |
| 1,705,197 | 3/1929 | Mills | 138/DIG. 6 |
| 2,237,321 | 4/1941 | Wesley | 138/DIG. 6 X |
| 2,780,504 | 2/1957 | Russell | 138/31 |
| 3,863,677 | 2/1975 | Tarsha | 138/31 |
| 4,000,758 | 1/1977 | Meisenheimer, Jr. | 138/31 |
| 4,307,753 | 12/1981 | Dryer | 138/31 X |

*Primary Examiner*—James E. Bryant, III
*Attorney, Agent, or Firm*—Parmelee, Bollinger & Bramblett

[57] ABSTRACT

A fluid reservoir and pressure protection device for use with fluid-filled systems comprises a cylindrical chamber wall, bottom chamber wall and depending mounting shank defining an inlet opening. A first piston slides in the cylindrical chamber wall between upper and lower positions, and has an annular working surface defining a central opening. A hollow cylindrical piston stem extends upwardly from the central opening. The first piston is spring biased downwardly. A second piston slides in the hollow piston stem between upper and lower positions. The working surface of the second piston, the annular surface of the first piston and the hollow piston stem together close a variable volume chamber. The second piston is also biased downwardly. A low friction support and interface for the piston stem includes an annular support ring extending inwardly from the upper cylindrical chamber wall and continuously surrounding the piston stem, at least one continuous piston stem guide ring fabricated of a rigid, lubricious long wearing polymer being carried in a groove in the support ring and interfacing with the piston stem. The exterior interfacing surface of said piston stem is anodized with a Type III or harder anodize. When the chamber is filled with fluid, the first piston is biased downwardly from its upward position to supply fluid to the system as required, and when additional fluid is forced from the system into the chamber, the first and thereafter the second piston are driven upwardly to accommodate it.

8 Claims, 2 Drawing Sheets

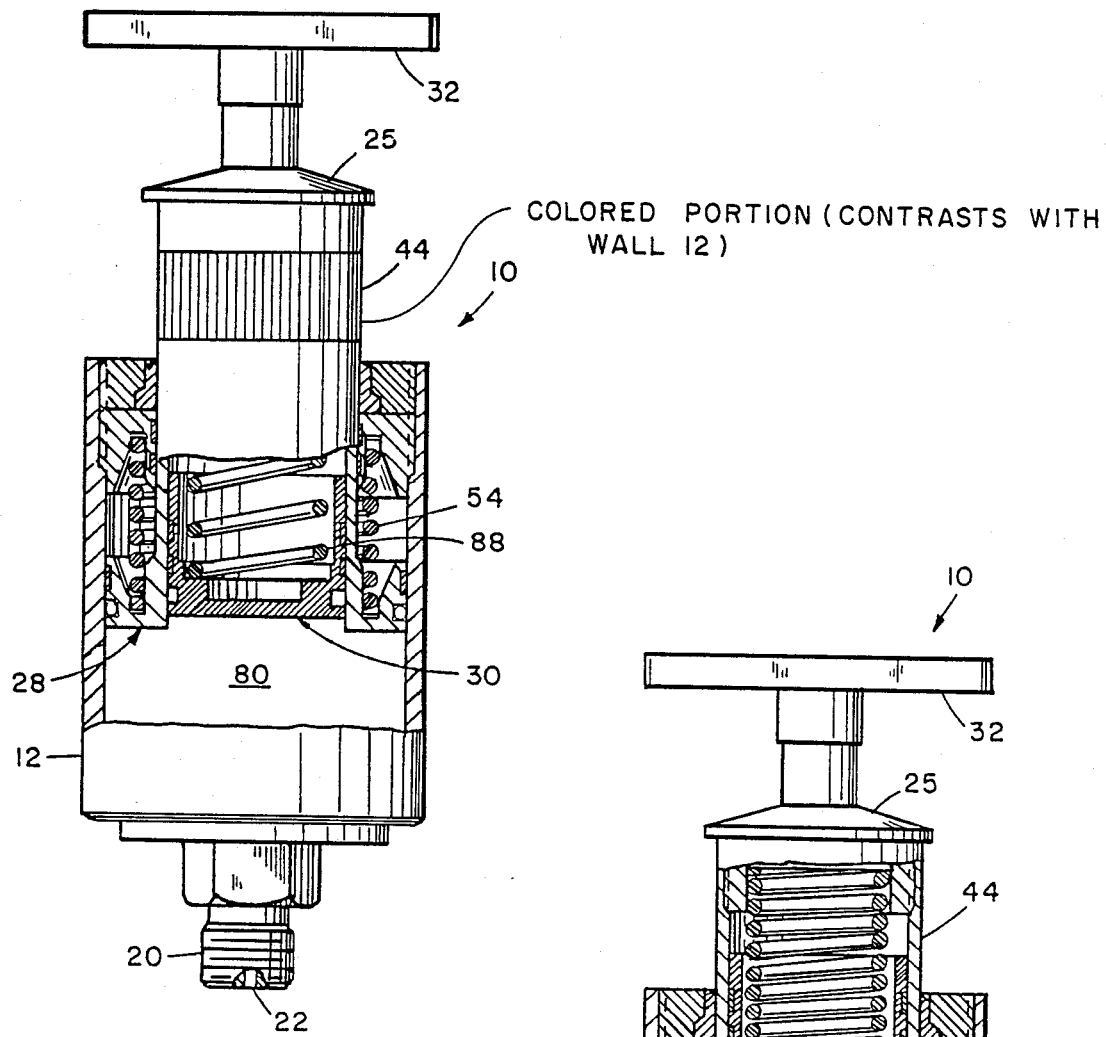
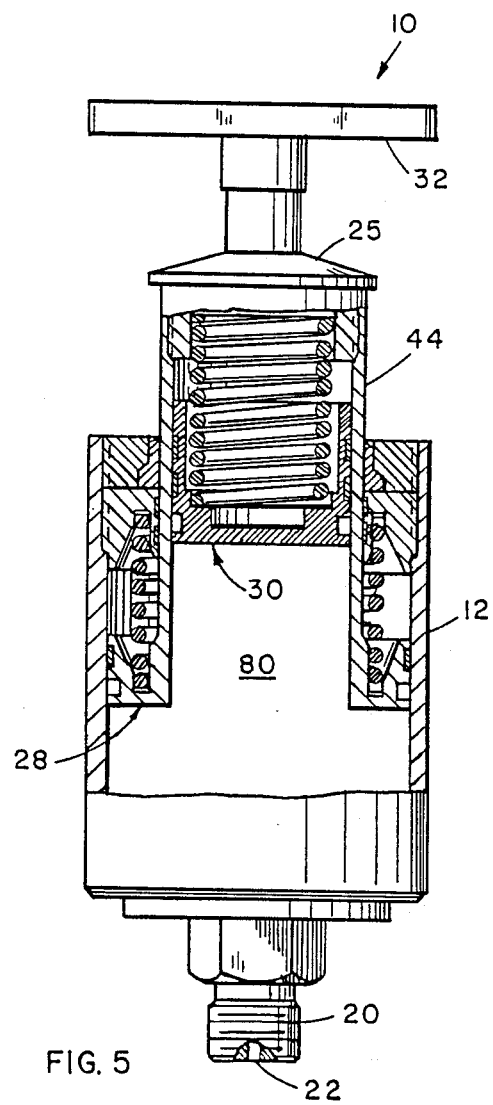
FIG. 4
FIG. 5

4,907,622

FLUID RESERVOIR DEVICE

This is a continuation of co-pending application Ser. No. 071,913 filed on Jul. 10, 1987, now abandoned.

FIELD OF INVENTION

The invention herein relates to an improvement in a fluid reservoir device with fill means and pressure protection means.

BACKGROUND OF INVENTION

The invention herein relates to an improvement in a fluid reservoir device will fill means, level indicator means and pressure relief means of the general type shown and described in U.S. Pat. No. 4,000,758, the disclosure of which is incorporated herein by reference.

The fluid reservoir device is used primarily in the rotary wing damper assembly of helicopters. The device provides a reservoir of additional hydraulic fluid for the rotary wing damper assembly and, in addition, accommodates surges in fluid pressure within the rotary wing damper assembly. This is accomplished firstby accepting and accommodating within the fluid reservoir device additional fluid forced from the rotary wing damper assembly, and secondary, by providing a pressure relief path if the fluid reservoir device is full and the fluid pressure becomes high.

The principles of operation of the fluid reservoir device have proven successful. However, experience in the use of the devices has also revealed that the reservoir piston undergoes a substantial amount of reciprocal travel due to pulsating pressure in the rotary wing damper assembly. Thus, the fluid reservoir devices are subject to a substantial amount of wear.

SUMMARY OF THE INVENTION

It is a principal object of the invention herein to provide a fluid reservoir device having improved wear characteristics.

It is an additional object of the invention herein to provide a fluid reservoir device characterized by smooth operation.

It is a further object of the invention herein to provide a fluid reservoir device which is rugged and durable.

An improved fluid reservoir and pressure protection device according to the invention herein is adapted for connection to and use with a fluid-filled system, particularly the rotary wing damper assembly of a helicopter. The fluid reservoir device includes a cylindrical side chamber wall and a bottom chamber wall, the latter having a mounting shank for attaching the device to the fluid-filled system and defining a fluid inlet opening. A first piston is received in the cylindrical chamber wall and is slideable between upper and lower positions, the first piston having an annular working surface defining a central opening and a hollow cylindrical piston stem extending upwardly from the central opening. Spring means bias the first piston downwardly toward the bottom chamber wall. A second piston is received in the hollow piston stem of the first piston, and the second piston is slideable between upper and lower positions therein. The working surface of the second piston together with the annular working surface of the first piston and the piston stem close a variable volume chamber, the volume of which depends on the positions of the pistons. Spring means also bias the second piston downwardly.

A low friction support for the piston stem includes a continuous annular support ring extending inwardly from the upper portion of the cylindrical chamber wall, the annular support ring surrounding the piston stem. The annular support ring carries at least one piston guide ring which extends inwardly into contact with the piston stem. The guide piston ring is formed of polytetrafluoroethylene or a similar rigid, lubricious and durable polymer material. The exterior of the cylindrical piston stem has an anodized coating of Type III or harder. This structure firmly supports the piston stem and exhibits good wear characteristics. The wear is further enhanced by protecting against ingress of abrasive contaminants through providing an additional scraper ring surrounding the piston stem, the scraper ring having a bevelled scraper surface oriented to clean the exterior surface of the piston stem clean as the piston stem moves downwardly. Anodized coating of Type III or harder is also provided on the interior of the cylindrical chamber wall, which slidingly receives a skirt of the first piston, the skirt carrying polytetrafluoroethylene or similar piston rings.

Additional objects and features of the invention herein will in part become apparent from the following description of the preferred embodiment and the claims taken together with the drawings.

DRAWINGS

FIG. 4 is a cross-sectional view of the fluid reservoir device, similar to FIG. 2, with a first piston of the device in its upper position; and FIG. 5 is a sectional view of the fluid reservoir device, similar to FIGS. 3 and 4, with a second piston of the device in its upper position.

The same reference numeral refer to the same elements throughout the various Figures.

DESCRIPTION OF PREFERRED EMBODIMENT

The invention herein relates to a fluid reservoir device for connection to and use with a fluid-filled system, such as a rotary wing damper assembly of a helicopter. The fluid reservoir device includes fill means and protection means for accommodating expansion and pressure surges of fluid in the system and relief of any excess pressure in the system.

Figure 1:
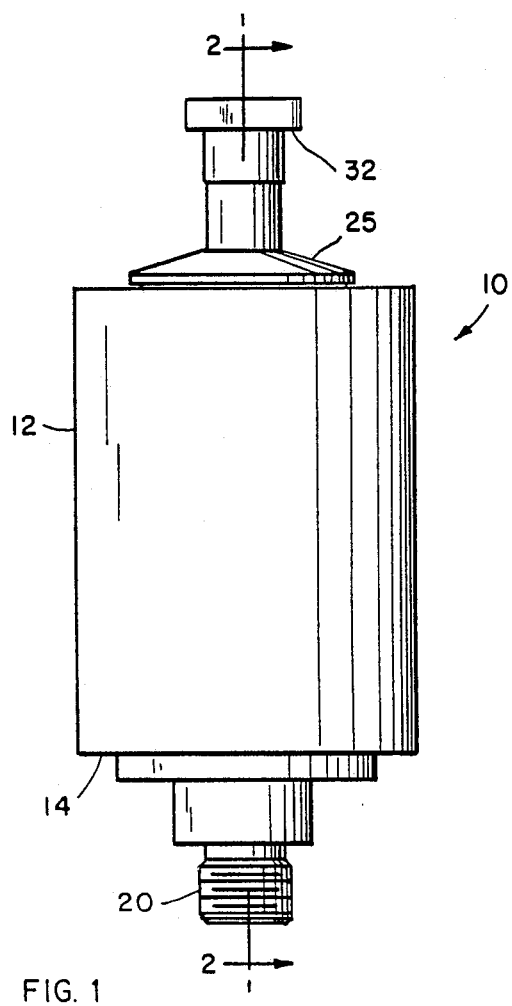
FIG. 1 is a side elevation view of an improved fluid reservoir device according to the invention herein.
Figure 2:
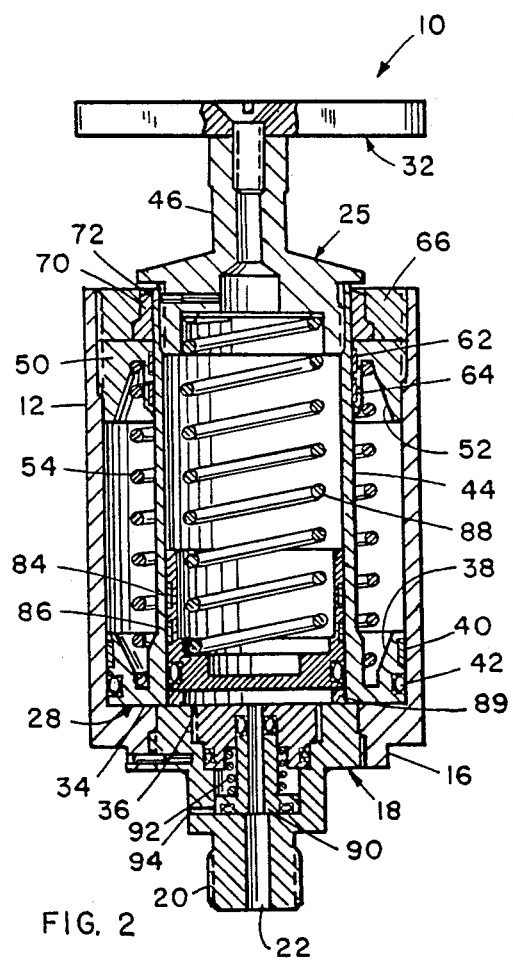
FIG. 2 is a sectional view of the fluid reservoir device of FIG. 1, taken along the lines 2—2 of FIG. 1.

With reference to FIG. 1, a fluid reservoir device 10 according to the invention herein is shown. The fluid reservoir device 10 comprises a cylindrical side chamber wall 12 having a bottom chamber wall 14 at its lower end. As best seen in FIG. 2, in the preferred embodiment the bottom wall is comprised of an inturned flange 16 and a pressure relief assembly 18. The pressure relief assembly 18 includes a threaded mounted shank 20 for connecting the fluid reservoir device to a fluid-filled system and defines an inlet opening 22 for fluid communication between the fluid reservoir device and fluid-filled system.

A piston assembly 25 is mounted within the cylindrical chamber wall 12 and, as more fully discussed below, comprises first and second pistons 28 and 30 providing the fluid reservoir and surge accommodation functions of the device. A handle 32 is provided for lifting the piston assembly 25 to fill the fluid reservoir device 10.

With particular references to FIGS. 2, 4 and 5, the first piston 28 has an annular working surface 34 defining a central opening 36. A piston skirt 38 extends upwardly from the outer periphery of the working surface 34. The piston skirt has a groove carrying a polytetrafluoroethylene piston ring 40 and additional groove carrying a resiliently backed piston ring 42.

Upstanding from the inner periphery of the annual working surface of the first piston is a hollow cylindrical piston stem 44. A handle base 46 is secured in the upper end of the piston stem, and the handle 32 is mounted thereon.

A continuous annular support ring 50 is threaded into upper interior of the cylindrical chamber wall 12. The support ring 50 has a groove 52 which receives the upper end of a coil spring 54. The coil spring 54 loosely surrounds the piston stem 44 and the lower end of the coil spring is received in the groove defined between the piston skirt 38 and the piston stem. Thus, the coil spring 54 biases the first piston 28 downwardly to the position shown in FIG. 2.

Figure 3:
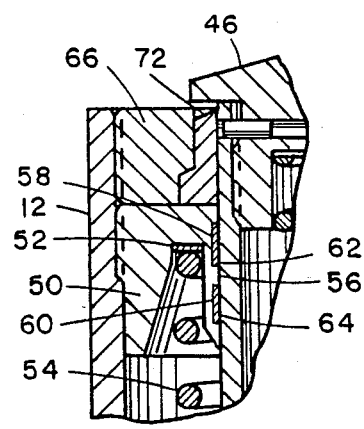
FIG. 3 is an enlarged fragmentary sectional view of a portion of FIG. 2, showing the piston stem support.

As best sent in FIGS. 2 and 3, the support ring 52 defines a cylindrical interior surface 56 which surrounds the piston stem 44. Two annular grooves are 58 and 60 are defined in the surface 56, and piston stem guide rings 62 and 64 are positioned in the grooves 58 and 60, respectively. The piston stem guide rings are in direct contact with the piston stem 44 and fabricated of polytetrafluoroethylene or other polymers having the characteristics of being rigid, lubricious and wear resistant. The piston stem guide rings 62 and 64 serve as bearings for the up and down movement of the piston stem. The piston stem itself is preferably fabricated of aluminum in order to be light weight, and the exterior surface of the piston stem 28 is anodized to at least Type III hardness to cooperate with the piston stem guide rings in reducing wear.

The continuous annular support ring 50 is secured by a locking ring 66 which also secures an annular scraper 70 in position surrounding the slideable piston stem 44. More particularly, the scraper 70 has a bevelled top surface 72 oriented to scrape foreign substances, particularly dirt, sand or other abrasives, from the piston stem 28 as the piston stem travels downwardly. This protects the surface of the piston stem and the stem guide rings from abrasion.

The second piston 30 has a circular working surface 74 which, together with the annular working surface 34 of the first piston 28, the cylindrical chamber wall 12 and bottom chamber wall 14, form a chamber 80 having variable volume depending upon the positions of the first and second pistons. The second piston 30 further comprises a cylindrical skirt 82 which is received in the hollow cylindrical piston stem 44 and is guided therein by piston rings 84 and 86. The piston rings 84 and 86 are also fabricated of polytetrafluoroethylene or other rigid, lubricious polymer and the inside surface of the piston stem 44 is anodized at Type III or greater hardness as defined by Military Specification Mil-A8625C. A coil spring 88 extends between the handle base 46 and the piston 30 for biasing piston 30 downwardly, with downward travel being limited by shoulder 89.

The fluid reservoir device is shown in its empty condition in FIG. 2, i.e. both pistons 28 and 30 are in their down positions and chamber 80 is at its minimum volume. In FIG. 4, the fluid reservoir device is shown with the first piston 28 in its upward position, whereby the chamber 80 comprises a reservoir volume associated with a fluid-filled system through the opening 22. The handle 32 may be utilized to pull the piston 28 to its upward position, drawing fluid from the fluid-filled system when the system itself is being filled or when fluid is being added. If thereafter fluid is lost from the system, the spring 54 drives the first piston 28 downwardly to supply fluid from the reservoir chamber 80 to the fluid system through the opening 22. Thus, in operation, the piston 28 is often at an intermediary position. The position of the handle 32 with respect to the top of the chamber wall 14 and the exposure of the piston stem 44 over the top of chamber wall 14 provide an indication of the amount of fluid in chamber 80 by exterior inspection. The color of the anodizing on piston rod 44 preferably contrasts with the color of the chamber wall 14 for that purpose.

When the piston 28 is in its upward position and the fluid in the fluid-filled system develops additional pressure, such as by temperature expansion or surges caused by mechanical operation, the higher pressure drives the second piston 30 upwardly against the bias of spring 88 to enlarge the volume of chamber 80. This is illustrated in FIG. 5. Thus, the excess pressure is alleviated by accommodating additional fluid in chamber 80. The spring rates of coil springs 54 and 88 are chosen such that an excess pressure condition first drives piston 28 to its upward position and thereafter acts to move piston 30, consistent with the fluid reservoir supply function of piston 28. If the pressure in the system continues to rise, piston 90 of the pressure relief assembly 18 rises against its bias spring 92 to uncover the opening 94 and permit the escape of fluid before the excess pressure damages the system.

In common operating parameters, the second piston 30 is in its downward position and the first piston 28 is in between its upward and downward limits. The pressure in the fluid-filled rotary wing damper assembly tends to surge, or pulsate, and the surges result in rapid reciprocation of piston 28. The support ring 50 and piston stem guide rings 62, 64 operate to keep the piston 28 properly aligned and to present a smooth long wearing surface interfacing with the piston stem 44.

The fluid reservoir device 10 exhibits improved wear characteristics over the previous devices and, accordingly, fulfills the objectives of the invention herein. It will be appreciated that the above description of the preferred embodiment is illustrative only, and that various alterations and substitutions can be made without departing from the spirit and scope of the invention, which is limited only by the following claims.

We claim:

1. A fluid reservoir and pressure protection device for connection to and use with a pressurized fluid system, comprising:
   (A) a housing having a bottom wall, a mounting shank defining a fluid inlet opening through the bottom wall and a cylindrical chamber wall, at least the interior of said cylindrical chamber wall being anodized;
   (B) a first piston slideably received in the cylindrical chamber wall and spring biased downwardly therein, said first piston having an upturned skirt carrying at least one piston ring fabricated of a hard, lubricious polymer which interfaces with the anodized cylindrical chamber wall, said first piston also having a piston stem defining an opening which extends through the first piston[3 s working surface, the exterior of the piston stem being anodized;

(C) an annular support ring extending from the upper portion of the cylindrical chamber wall and having a continuous cylindrical surface closely surrounding the piston stem, said cylindrical surface defining at least one annular groove carrying a piston stem guide ring fabricated of a rigid lubricious polymer, which interfaces with the anodized surface of the piston stem;

(D) an annular scraper mounted above the annular support ring, said annular scraper having a cylindrical surface closely continuously surrounding the stem of the first piston and a bevelled top surface oriented to scrape and disperse foreign matter therefrom or the piston stem travels downwardly; and (E) a second piston slideably received in the stem of the first piston, and spring biased downwardly therein, said first and second pistons defining a variable volume chamber in fluid and pressure communication with the pressurized fluid system, whereby fluid in the fluid reservoir and pressure protection device provides a reservoir for the pressurized fluid system and fluid from the system may be forced into the fluid reservoir and pressure protection device to alleviate pressure in the fluid system.

2. A fluid reservoir and pressure protection device as defined in claim 1 wherein at least a portion of the piston stem is colored to contrast with the outer surface of the cylindrical chamber wall.

3. A fluid reservoir and pressure protection device as defined in claim 1 and further comprising:

(F) a locking ring received in the upper portion of cylindrical chamber wall, the locking ring securing the annular support ring and scraper within the cylindrical chamber wall.

4. A fluid reservoir and pressure protection device as defined in claim 3 wherein the annular support ring defines a downwardly facing annular channel and the first piston is spring biased downwardly by a coil spring having its upper end received in the downwardly facing annular channel.

5. A fluid reservoir and pressure protection device as defined in claim 3 wherein at least a portion of the piston stem is colored to contrast with the outer surface of the cylindrical chamber wall.

6. A fluid reservoir and pressure protection device as defined in claim 1 wherein the piston stem guide ring is fabricated or polytetrafluoroethylene.

7. A fluid reservoir and pressure protection device as defined in claim 1 wherein the annular support ring defines a second groove carrying a second piston stem guide ring interfacing with and supporting the piston stem.

8. A fluid reservoir and pressure protection device as defined in claim 1 wherein the annular support ring defines a downwardly facing annular channel and the first piston is spring biased downwardly by a coil spring having its upper end received in the downwardly facing annular channel.

* * * * *